US008083338B2

(12) United States Patent
Claes et al.

(10) Patent No.: US 8,083,338 B2
(45) Date of Patent: Dec. 27, 2011

(54) RADIATION-CURABLE INK-JET PRINTING

(75) Inventors: Roland Claes, Dendermonde (BE); Geert Deroover, Lier (BE); Frank De Voeght, Heist (BE)

(73) Assignee: Agfa Graphics N.V., Mortsel (BE)

( * ) Notice: Subject to any disclaimer, the term of this patent is extended or adjusted under 35 U.S.C. 154(b) by 764 days.

(21) Appl. No.: 11/122,527

(22) Filed: May 5, 2005

(65) Prior Publication Data

US 2005/0250869 A1    Nov. 10, 2005

Related U.S. Application Data

(60) Provisional application No. 60/578,770, filed on Jun. 10, 2004.

(30) Foreign Application Priority Data

May 6, 2004  (EP) .................................... 04101967

(51) Int. Cl.
C09D 11/00    (2006.01)

(52) U.S. Cl. ...................................... 347/100; 106/31.13

(58) Field of Classification Search .................. 347/100; 106/31.13
See application file for complete search history.

(56) References Cited

U.S. PATENT DOCUMENTS

| | | | |
|---|---|---|---|
| 2,303,376 A | 12/1942 | Mejean | |
| 4,781,985 A | 11/1988 | Desjarlais | |
| 5,084,340 A | 1/1992 | Light | |
| 5,085,698 A | 2/1992 | Ma et al. | |
| 5,285,064 A | 2/1994 | Willoughby | |
| 5,389,133 A | 2/1995 | Gundlach et al. | |
| 5,443,628 A | 8/1995 | Loria et al. | |
| 5,538,548 A | 7/1996 | Yamazaki | |
| 5,614,007 A | 3/1997 | Kurabayashi et al. | |
| 5,713,993 A | 2/1998 | Grezzo Page et al. | |
| 5,720,802 A | 2/1998 | Wong et al. | |
| 5,852,075 A | 12/1998 | Held | |
| 5,969,002 A | 10/1999 | Kijlstra et al. | |
| 6,033,463 A | 3/2000 | Yui et al. | |
| 6,079,824 A * | 6/2000 | Gotoh ........................... | 347/100 |
| 6,273,550 B1 | 8/2001 | Brown | |
| 6,284,816 B1 * | 9/2001 | Laksin et al. ................. | 523/160 |
| 6,332,943 B1 * | 12/2001 | Herrmann et al. ............ | 156/277 |
| 6,428,862 B1 | 8/2002 | Noguchi | |
| 6,467,898 B2 * | 10/2002 | Codos et al. .................. | 347/102 |
| 6,843,840 B2 * | 1/2005 | Kataoka et al. ............... | 106/31.6 |
| 6,846,353 B2 | 1/2005 | Sano et al. | |
| 6,889,608 B2 * | 5/2005 | Pitz ............................. | 101/424.1 |
| 2001/0029276 A1 * | 10/2001 | Ishihara et al. ............... | 524/407 |
| 2002/0064603 A1 | 5/2002 | Noguchi | |
| 2003/0007050 A1 * | 1/2003 | Wu et al. ......................... | 347/96 |
| 2003/0035034 A1 * | 2/2003 | Fukumoto et al. .............. | 347/86 |
| 2003/0048327 A1 | 3/2003 | Serra et al. | |
| 2003/0056687 A1 * | 3/2003 | Sano ............................. | 106/31.6 |
| 2003/0083396 A1 * | 5/2003 | Ylitalo et al. .................... | 522/74 |
| 2003/0122905 A1 * | 7/2003 | Suzuki et al. .................... | 347/85 |
| 2003/0199612 A1 * | 10/2003 | Nakajima ....................... | 523/160 |
| 2003/0231234 A1 * | 12/2003 | Ushirogouchi et al. ....... | 347/100 |
| 2004/0006157 A1 | 1/2004 | Gloster et al. | |
| 2004/0053988 A1 * | 3/2004 | Taguchi et al. ................ | 514/419 |
| 2004/0103818 A1 * | 6/2004 | Kataoka et al. ............... | 106/31.27 |
| 2004/0132862 A1 * | 7/2004 | Woudenberg .................. | 523/160 |

FOREIGN PATENT DOCUMENTS

| | | |
|---|---|---|
| EP | 0 259 130 | 3/1988 |
| EP | 0 429 828 A1 | 6/1991 |
| EP | 0 526 198 A1 | 2/1993 |
| EP | 0 675 178 A2 | 10/1995 |
| EP | 0 737 001 A2 | 10/1996 |
| EP | 0 776 952 A2 | 6/1997 |
| EP | 0 953 613 A2 | 11/1999 |
| EP | 1 048 475 A2 | 11/2000 |
| EP | 1 208 991 A2 | 5/2002 |
| EP | 1 273 453 A2 | 1/2003 |
| EP | 1 391 488 A1 | 2/2004 |
| JP | 64-74278 A | 3/1989 |
| JP | 11-43639 A | 2/1999 |
| JP | 11-228886 A | 8/1999 |
| JP | 2001-115067 A | 4/2001 |
| JP | 2003-276175 A | 9/2003 |
| JP | 2004-027127 A | 1/2004 |
| WO | WO 2004/026978 A1 | 4/2004 |

OTHER PUBLICATIONS

Desie et al., *Proceedings of Imaging Science and Technology*, 360-365 (2002).
Herbst et al., *Industrial Organic Pigments, Production, Properties*, $2^{nd}$ Edition (1997).
Mc Cutcheon, *Functional Materials*, North American Edition, 110-129 (1990).
Search Report for EP 0410967 (Sep. 21, 2004).

* cited by examiner

Primary Examiner — Laura Martin
(74) Attorney, Agent, or Firm — Leydig, Voit & Mayer, Ltd.

(57) ABSTRACT

A radiation-curable ink-jet black ink is provided which includes a black pigment, at least one colour pigment and at least one radiation-curable compound. An ink-jet ink set which includes the radiation-curable ink-jet black ink and a process for printing with such an ink-jet ink set are also disclosed. Image quality defects of noticeable chromatic variation in adjacent print patches of bi-directional printing are eliminated and reduced ink consumption is observed.

20 Claims, No Drawings

RADIATION-CURABLE INK-JET PRINTING

CROSS-REFERENCE TO RELATED PATENT APPLICATIONS

This application claims the benefit of U.S. Provisional Application No. 60/578,770 filed Jun. 10, 2004, which is incorporated by reference. In addition, this application claims the benefit of European Application No. 04101967 filed May 6, 2004, which is also incorporated by reference.

TECHNICAL FIELD

The present invention relates to the printing of UV-curable inks on substantially non-absorbing ink-jet ink receivers. It further relates to UV-curable black inks.

BACKGROUND ART

In ink-jet printing tiny drops of ink fluid are projected directly onto an ink-receiver surface without physical contact between the printing device and the ink-receiver. The printing device stores the printing data electronically and controls a mechanism for ejecting the ink drops image-wise onto the ink-receiver.

In most cases, printing is accomplished by moving the print head in a direction across the ink receiver (the main scan direction), while at the same time the ink receiver is advanced in a direction perpendicular to the main scan direction (the sub scan direction). The print head of an inkjet colour printer generally comprises a plurality of head-segments arrayed in the main scan direction. Each head segment has a plurality of nozzles arranged at different locations in the sub scan direction. Colour printing is performed in accordance with the subtractive colour model. The subtractive colour model is represented typically by a combination CMY, of cyan (C), magenta (M) and yellow (Y) inks or a more typical combination, CMYK, of CMY plus black (K) ink. A typical configuration of a print head is four head-segments, one per colour, arranged in a nozzle order of KCMY so that when printing in a unidirectional mode the K ink is the first to be jetted on the ink receiver, followed by C, M, and finally Y ink. However, to reduce print time the printers are generally designed with a bi-directional mode of printing capability.

In bi-directional mode printing, the print head with a nozzle order KCMY would print a patch with an ink order of K, C, M, and Y from left-to-right and a print patch with a reversed ink order of Y, M, C, and K when printing from right-to-left. This results in a noticeable chromatic variation in adjacent print patches. A patch printed with an ink order of K, C, M, and Y appears "lighter" to the human eye than a patch printed with an ink order of Y, M, C, and K. This phenomenon is due to the fact that each of the four standard subtractive process colours has a unique brightness distinguishable by the human eye. As the black ink K absorbs most of the light it can be regarded as the most critical ink for chromatic variations.

This image quality defect, usually referred to as "bi-directional hue shift", is reduced in EP 737001 A (XEROX) by introducing a complex colour management system having two colour mapping look-up tables. The first colour mapping look-up table is used when the print head travels from left-to-right, while the second colour mapping look-up table is used when the print head travels back from right-to-left. Similar methods for colour correction in bi-directional printing are disclosed in EP 1048475 A (HEWLETT-PACKARD) and US 20030048327 (HEWLETT-PACKARD).

Another approach is disclosed by EP 1208991 A (OCE TECH) which doubles the number of head-segments of the print head by having two head-segments for each colour and arranging them symmetrically in the main scan direction. This results in a print head having the following sequence of head-segments: C1, M1, Y1, Y2, M2, and C2. In printing from left-to-right the head-segments C1, M1, and Y1 are used, while in printing from right-to-left the head-segments Y2, M2, and C2 are used. Hereby the cyan ink is always the first to be jetted on the ink receiver, followed by the magenta ink, and finally the yellow ink. Similar printing methods for reducing bi-directional hue shift by using print head with a plurality of head-segments are disclosed in EP 1273453 A (HEWLETT-PACKARD) and U.S. Pat. No. 6,273,550 (MUTOH).

Ink compositions for ink-jet typically include following ingredients: dyes or pigments, water and/or organic solvents, humectants such as glycols, detergents, thickeners, polymeric binders, preservatives, etc. It will be readily understood that the optimal composition of such ink is dependent on the ink-jetting method used and on the nature of the ink-receiver to be printed. The ink compositions can be roughly divided in:
  water-based, the drying mechanism involving absorption, penetration and evaporation;
  oil-based, the drying involving absorption and penetration;
  solvent-based, the drying primarily involving evaporation;
  hot melt or phase change, in which the ink is liquid at the ejection temperature but solid at room temperature and wherein drying is replaced by solidification;
  UV-curable, in which drying is replaced by polymerization.

Water-based inks suffer from a number of disadvantages such as: (a) their requiring water evaporation and therefore an extensive drying system, especially when printing speed is important; (b) the tendency of large printed areas to cockle, (c) sensitivity of images to wet and dry rubbing, (d) the tendency of low viscosity inks to dry at the tip of the orifice. The use of polar solvent-based inks can overcome some of the problems inherent in water-based inks, but results in other problems such as the possible generation of toxic or inflammable vapours. Therefore efforts were made to develop low-solvent ink compositions from which the concept of UV-curable ink compositions emerged.

It will be readily understood that the first two types of ink compositions are more suitable for a receiving medium that is more or less absorptive, whereas UV-curable inks are more suitable for non-absorbent ink-receivers.

However, the behaviour and interaction of a UV-curable ink on a substantially non-absorbing ink-receiver was found to be quite complicated compared to a water- or a solvent-based ink on absorbent ink-receivers. For example, a good and controlled spreading of the ink on the substrate is problematic. Also droplets of different colour inks are jetted on top of one another, causing problems such as coalescence of adjacent ink dots. To reduce these problems the curing means can be arranged in combination with the print head of the ink-jet printer, travelling therewith so that images printed upon the surface of the ink-receiver are exposed to curing radiation very shortly after having been printed upon the ink-receiver. In US 2004006157, the jetting and curing of the ink is performed by an ink jet printhead with an ultra violet lamp attached to the printhead. This further enlarges the print head and complicates its design.

Accordingly, it would be highly desirable to have a UV-curable ink-jet printing process that reduces bi-directional hue shift without compromising throughput and without requiring extra cost or complexity in the printing process.

OBJECTS OF THE INVENTION

It is an object of the present invention to provide an ink-jet printing process that reduces bi-directional hue shift without compromising throughput and without requiring extra cost or complexity in the printing process.

It is another object of the present invention to provide an ink-jet printing process with reduced ink consumption.

These and other objects of the invention will become apparent from the description hereinafter.

SUMMARY OF THE INVENTION

It has been found that printing with a radiation-curable ink-jet black ink comprising at least one black pigment, at least one colour pigment and at least one radiation-curable compound, eliminates image quality defects of noticeable chromatic variation in adjacent print patches in bi-directional printing.

Objects of the present invention are realized by a radiation-curable ink-jet black ink comprising a black pigment, at least one colour pigment and at least one radiation-curable compound.

Objects of the present invention are also realized by a process for ink-jet printing comprising the steps of:
  a) providing a radiation-curable inkjet black ink as defined above, and
  b) jetting said radiation-curable ink-jet black ink on a substantially non-absorbing ink-jet ink receiver.

Further advantages and embodiments of the present invention will become apparent from the following description.

DETAILED DESCRIPTION OF THE INVENTION

Definitions

The term "UV" is used in disclosing the present application as an abbreviation for ultraviolet radiation.

The term "ultraviolet radiation" as used in disclosing the present invention, means electromagnetic radiation in the wavelength range of 4 to 400 nanometers.

The term "actinic radiation" as used in disclosing the present invention, means electromagnetic radiation capable of initiating photochemical reactions.

The term "ink-jet ink set", as used in disclosing the present invention, means a combination of at least one black ink and at least three colour inks, e.g. magenta ink (M), cyan ink (C) and yellow ink (Y).

The term "colorant", as used in disclosing the present invention, means dyes and pigments.

The term "dye", as used in disclosing the present invention, means a colorant having a solubility of 10 mg/L or more in the medium in which it is applied and under the ambient conditions pertaining.

The term "pigment" is defined in DIN 55943, herein incorporated by reference, as an inorganic or organic, chromatic or achromatic colouring agent that is practically insoluble in the application medium under the pertaining ambient conditions, hence having a solubility of less than 10 mg/L therein.

The term "black pigment", as used in disclosing the present invention, means a pigment exhibiting a black colour.

The term "colour pigment", as used in disclosing the present invention, means a pigment exhibiting a colour different from black, e.g. a cyan pigment, a magenta pigment, a yellow pigment, a red pigment, a blue pigment and a green pigment.

The term "colour ink", as used in disclosing the present invention, means an ink-jet ink exhibiting a colour different from black, e.g. cyan, magenta, yellow, red, blue and green.

The "chroma C*", as used in disclosing the present invention, is defined as:

$$C^* = \sqrt{(a^*)^2 + (b^*)^2}$$

where a* and b* are the hue values in the CieL*a*b* colour system. The L*, a* and b* CIELAB-values are defined in ASTM Norm E179-90 in a R(45/0) geometry with evaluation according to ASTM Norm E308-90.

The term "areal throughput", as used in disclosing the present invention, means the area of ink-receiver printed per unit time.

The term "filler", as used in disclosing the present invention, means an inorganic or organic material added to an ink-receiver to modify its properties, e.g. adhesion of a subbing layer to a polyester film, opacity of an ink-receiver and tribo-electrical properties.

The term "monofunctional" means one reactive functional group.

The term "difunctional" means two reactive functional groups.

The term "polyfunctional" means more than one reactive functional group.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

The term "acyl group" as used in disclosing the present invention means
  (C=O)-aryl and —(C=O)-alkyl groups.

The term "aliphatic group" as used in disclosing the present invention means saturated straight chain, branched chain and alicyclic hydrocarbon groups.

The term "unsaturated aliphatic group" as used in disclosing the present invention means straight chain, branched chain and alicyclic hydrocarbon groups which contain at least one double or triple bond.

The term "aromatic group" as used in disclosing the present invention means an assemblage of cyclic conjugated carbon atoms, which are characterized by large resonance energies, e.g. benzene, naphthalene and anthracene.

The term "alicyclic hydrocarbon group" means an assemblage of cyclic conjugated carbon atoms, which do not form an aromatic group, e.g. cyclohexane.

The term "substituted" as used in disclosing this invention means that one or more of the carbon atoms and/or that a hydrogen atom of one or more of carbon atoms in an aliphatic group, an aromatic group or an alicyclic hydrocarbon group, are replaced by an oxygen atom, a nitrogen atom, a sulphur atom, a selenium atom or a tellurium atom. Such substituents include hydroxyl groups, ether groups, carboxylic acid groups, ester groups, amide groups and amine groups.

The term "heteroaromatic group" means an aromatic group wherein at least one of the cyclic conjugated carbon atoms is replaced by an oxygen atom, a nitrogen atom, a sulphur atom, a selenium atom or a tellurium atom.

The term "heterocyclic group" means an alicyclic hydrocarbon group wherein at least one of the cyclic conjugated carbon atoms is replaced by an oxygen atom, a nitrogen atom, a sulphur atom, a selenium atom or a tellurium atom.

The term "substantially non-absorbing ink-jet ink-receiver" means any ink-jet ink-receiver which fulfils at least one of the following two criteria:

1) No penetration of ink into the ink-jet ink-receiver deeper than 2 μm;
2) No more than 20% of a droplet of 100 pL jetted onto the surface of the ink-jet ink-receiver disappears into the ink-jet ink-receiver in 5 seconds. If one or more coated layers are present, the dry thickness should be less than 5 μm. Standard analytical method can be used by one skilled in the art to determine whether an ink-receiver falls under either or both of the above criteria of a substantially non-absorbing ink-receiver. For example, after jetting ink on the ink-receiver surface, a slice of the ink-receiver can be taken and examined by transmission electron microscopy to determine if the penetration depth of the ink is greater than 2 μm. Further information regarding suitable analytical methods can be found in the article: DESIE, G, et al. Influence of Substrate Properties in Drop on Demand Printing. *Proceedings of Imaging Science and Technology's* 18*th International Conference on Non Impact Printing.* 2002, p. 360-365.

The term "dpi" is an abbreviation of the term dots per inch, i.e. the number of dots made by inkjet-ink droplets per 2.54 cm.

Ink-Jet Ink

The radiation-curable ink-jet black ink according to the present invention contains at least three components: (i) a black pigment, (ii) a colour pigment, and (iii) a radiation-curable compound.

The radiation-curable compound can be selected from monomers and/or oligomers that can be polymerized by a curing means of an ink-jet printer.

The radiation-curable ink-jet black ink according to the present invention preferably further contains at least one photo-initiator.

The radiation-curable ink-jet black ink according to the present invention may contain a polymerization inhibitor to restrain polymerization by heat or actinic radiation. It is preferred to add an inhibitor during preparation of the ink-jet ink.

Objects of the present invention are also realized with a radiation-curable ink-jet ink set comprising at least one radiation-curable ink-jet black ink as defined above and at least three radiation-curable ink-jet colour inks.

The radiation-curable ink-jet black ink according to the present invention may further contain at least one resin in order to obtain a stable dispersion of the colorant in the ink-jet ink.

The radiation-curable ink-jet black ink according to the present invention may further contain at least one surfactant for controlling the spreading of an ink-jet ink droplet on the substantially non-absorbing ink-jet ink receiver.

The radiation-curable ink-jet black ink according to the present invention may further contain water and/or organic liquids, such as alcohols, fluorinated solvents and dipolar aprotic liquids.

The radiation-curable ink-jet black ink according to the present invention may further contain at least one humectant to prevent the clogging of the nozzle, due to its ability to slow down the evaporation rate of ink.

A biocide may be added to the radiation-curable ink-jet black ink according to the present invention to prevent unwanted microbial growth, which may occur in the ink-jet ink over time. The biocide may be used either singly or in combination.

The radiation-curable ink-jet black ink according to the present invention may further contain additives such as buffering agents, anti-mold agents, pH adjustment agents, electric conductivity adjustment agents, chelating agents, anti-rusting agents and light stabilizers. Such additives may be incorporated in the ink-jet inks of the present invention in any effective amount, as desired. Examples of pH controlling agents suitable for inks of the present invention include, but are not limited to, acids, and bases, including hydroxides of alkali metals such as lithium hydroxide, sodium hydroxide and potassium hydroxide. The amount included will depend upon the specific component being included.

The ink-jet ink preferably has a viscosity at a shear rate of 100 s$^{-1}$ and at the intended jetting temperature of less than 100 mPa·s, preferably less than 50 mPa·s, and more preferably less than 30 mPa·s.

Colorants

The radiation-curable ink-jet black ink according to the present invention contains at least one black pigment and at least one colour pigment. Additionally other colorants may be added. Colorants may be dyes, but are preferably pigments or a combination thereof. Organic and/or inorganic pigments may be used.

In a preferred embodiment the radiation-curable ink-jet black ink according to the present invention includes at least one colour pigment with an absorption maximum between 500 and 700 nm.

In another preferred embodiment the radiation-curable ink-jet black ink according to the present invention includes a cyan pigment or a magenta pigment.

In still another preferred embodiment the radiation-curable ink-jet black ink according to the present invention includes a cyan pigment and a magenta pigment.

The radiation-curable ink-jet ink set according to the present invention contains at least one radiation-curable ink-jet black ink according to the present invention and at least three radiation-curable ink-jet colour inks, preferably magenta ink (M), cyan ink (C) and yellow ink (Y).

The radiation-curable ink-jet ink set according to the present invention may contain a second radiation-curable ink-jet black ink using the same colorants at lower concentrations than the first radiation-curable ink-jet black ink or using different colorants with about the same hue. Usually this second radiation-curable ink-jet black ink is called a low density black ink.

The radiation-curable ink-jet ink set according to the present invention may also include additional colour inks, e.g. a light magenta ink and a light cyan ink, or an ink for a specific spot colour, e.g. orange, green, red and blue.

The radiation-curable ink-jet ink set according to the present invention may also include special types of ink such as white inks, infrared absorbing inks and fluorescent inks.

In a preferred embodiment, the radiation-curable ink-jet ink set according to the present invention comprises the radiation-curable ink-jet black ink according to the present invention and a cyan (C), magenta (M) and yellow (Y) ink. The colorants of the C, M and Y inks may be dyes, but are preferably pigments or a combination thereof. Both organic and/or inorganic pigments may be used.

The pigment particles should be sufficiently small to permit free flow of the ink through the ink-jet printing device, especially at the ejecting nozzles which usually have a diameter ranging from 10 μm to 50 μm. The particle size influences also the pigment dispersion stability. It is also desirable to use small particles for maximum colour strength. The particles of the pigment dispersed in the ink-jet ink should have a particle size of less than 10 μm, preferably less than 3 μm, and most preferably less than 1 μm. The average particle size of pigment particles is preferably 0.05 to 0.5 μm. Very fine dispersions of pigments and methods for their preparation are disclosed in e.g. EP 776952 A, U.S. Pat. No. 5,538,548, U.S. Pat. No. 5,443,628, EP 259130 A, U.S. Pat. No. 5,285,064, EP 429828A and EP 526198 A.

Dyes suitable for the radiation-curable ink-jet ink set according to the present invention include direct dyes, acidic dyes, basic dyes and reactive dyes.

Suitable direct dyes for the radiation-curable ink-jet ink set according to the present invention include:
- C.I. Direct Yellow 1, 4, 8, 11, 12, 24, 26, 27, 28, 33, 39, 44, 50, 58, 85, 86, 100, 110, 120, 132, 142, and 144
- C.I. Direct Red 1, 2, 4, 9, 11, 134, 17, 20, 23, 24, 28, 31, 33, 37, 39, 44, 47, 48, 51, 62, 63, 75, 79, 80, 81, 83, 89, 90, 94, 95, 99, 220, 224, 227 and 343
- C.I. Direct Blue 1, 2, 6, 8, 15, 22, 25, 71, 76, 78, 80, 86, 87, 90, 98, 106, 108, 120, 123, 163, 165, 192, 193, 194, 195, 196, 199, 200, 201, 202, 203, 207, 236, and 237
- C.I. Direct Black 2, 3, 7, 17, 19, 22, 32, 38, 51, 56, 62, 71, 74, 75, 77, 105, 108, 112, 117, and 154

Suitable acidic dyes for the radiation-curable ink-jet ink set according to the present invention include:
- C.I. Acid Yellow 2, 3, 7, 17, 19, 23, 25, 20, 38, 42, 49, 59, 61, 72, and 99
- C.I. Acid Orange 56 and 64
- C.I. Acid Red 1, 8, 14, 18, 26, 32, 37, 42, 52, 57, 72, 74, 80, 87, 115, 119, 131, 133, 134, 143, 154, 186, 249, 254, and 256
- C.I. Acid Violet 11, 34, and 75
- C.I. Acid Blue 1, 7, 9, 29, 87, 126, 138, 171, 175, 183, 234, 236, and 249
- C.I. Acid Green 9, 12, 19, 27, and 41
- C.I. Acid Black 1, 2, 7, 24, 26, 48, 52, 58, 60, 94, 107, 109, 110, 119, 131, and 155

Suitable reactive dyes for the radiation-curable ink-jet ink set according to the present invention include:
- C.I. Reactive Yellow 1, 2, 3, 14, 15, 17, 37, 42, 76, 95, 168, and 175
- C.I. Reactive Red 2, 6, 11, 21, 22, 23, 24, 33, 45, 111, 112, 114, 180, 218, 226, 228, and 235
- C.I. Reactive Blue 7, 14, 15, 18, 19, 21, 25, 38, 49, 72, 77, 176, 203, 220, 230, and 235
- C.I. Reactive Orange 5, 12, 13, 35, and 95
- C.I. Reactive Brown 7, 11, 33, 37, and 46
- C.I. Reactive Green 8 and 19
- C.I. Reactive Violet 2, 4, 6, 8, 21, 22, and 25
- C.I. Reactive Black 5, 8, 31, and 39

Suitable basic dyes for the radiation-curable ink-jet ink set according to the present invention include:
- C.I. Basic Yellow 11, 14, 21, and 32
- C.I. Basic Red 1, 2, 9, 12, and 13
- C.I. Basic Violet 3, 7, and 14
- C.I. Basic Blue 3, 9, 24, and 25

Dyes can only manifest the ideal colour in an appropriate range of pH value. Therefore, the radiation-curable ink-jet ink set of the present invention preferably further comprises a pH buffer, such as potassium hydroxide (KOH).

Black Pigment

Carbon black is usually used as the colouring material in black ink. In UV-curable ink, it always exhibits a warm brownish black tone, which is corrected to a neutral tone by overprinting with cyan and magenta ink. This results in noticeable chromatic variations in adjacent print patches when a bi-directional printing mode is used. A radiation-curable ink-jet black ink comprising at least one black pigment, at least one colour pigment and at least one radiation-curable compound, eliminates these bi-directional hue shift.

Suitable black pigment materials include carbon blacks such as Pigment Black 7 (e.g. Carbon Black MA8™ from MITSUBISHI CHEMICAL), Regal™ 400R, Mogul™ L, Elftex™ 320 from CABOT Co., or Carbon Black FW18, Special Black 250, Special Black 350, Special Black 550, Printex™ 25, Printex™ 35, Printex™ 55, Printex™ 90, Printex™ 150T from DEGUSSA. Additional examples of suitable pigments are disclosed in U.S. Pat. No. 5,389,133 (XEROX).

The black pigment is present in the range of 0.1 to 10 wt %, preferably in the range 1 to 5 wt % based on the total weight of the radiation-curable ink-jet black ink.

The radiation-curable ink-jet black ink according to the present invention preferably has a chroma $C^*$ not larger than 4.0, particularly preferably less than 1.5. A reduced ink consumption was observed with a radiation-curable ink-jet black ink comprising a cyan and a magenta pigment and having a chroma $C^*$ not larger than 4.0.

The reduced ink consumption results in thinner cured ink-jet images. Unlike water or solvent based inkjet inks that penetrate into a porous ink-receiver, radiation curable inks are usually jetted upon a substantially non-absorbing ink-receiver and form an image of a certain thickness. This image thickness not only gives a different look-and-feel, but can have disadvantages in physical properties. For example, when the ink receiver with the cured image is bent, the image may exhibit cracks or reduced adhesion.

Colour Pigment

Pigments suitable for the radiation-curable ink-jet ink set according to the present invention include as red or magenta pigments: Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257, Pigment Violet 3, 19, 23, 29, 30, 37, 50, and 88; as blue or cyan pigments: Pigment Blue 1, 15, 15:1, 15:2, 15:3, 15:4, 15:6, 16, 17-1, 22, 27, 28, 29, 36, and 60; as green pigments: Pigment green 7, 26, 36, and 50; as yellow pigments: Pigment Yellow 1, 3, 12, 13, 14, 17, 34, 35, 37, 55, 74, 81, 83, 93, 94, 95, 97, 108, 109, 110, 128, 137, 138, 139, 153, 154, 155, 157, 166, 167, 168, 177, 180, 185, and 193; as white pigment: Pigment White 6, 18, and 21.

Furthermore, the pigment may be chosen from those disclosed by HERBST, W, et al. Industrial Organic Pigments, Production, Properties, Applications. 2nd edition. VCH, 1997.

Most preferred pigments are Pigment Yellow 1, 3, 128, 109, 93, 17, 14, 10, 12, 13, 83, 65, 75, 74, 73, 138, 139, 154, 151, 180, 185; Pigment Red 122, 22, 23, 17, 210, 170, 188, 185, 146, 144, 176, 57:1, 184, 202, 206, 207; Pigment Blue 15:3, Pigment Blue 15:2, Pigment Blue 15:1, Pigment Blue 15:4, Pigment Blue 15:6, Pigment Blue 16 and Pigment Violet 19.

The colour pigment is present in the range of 0.1 to 10 wt %, preferably in the range 1 to 5 wt % based on the total weight of the radiation-curable ink-jet colour ink.

Monomers and Oligomers

The radiation-curable ink-jet black ink according to the present invention contains monomers and/or oligomers, which are polymerized by the curing means of the ink-jet printer. Monomers, oligomers or prepolymers may possess different degrees of functionality, and a mixture including combinations of mono-, di-, tri- and higher functionality monomers, oligomers and/or prepolymers may be used. These components are curable, typically photo-curable, e.g. UV curable, and should adhere to the ink-receiver surface after printing and serve to bind the colorant. A mixture of two or more monomers of the same functionality is preferred. With particularly preferred a mixture of two di-functional monomers.

The viscosity of the ink-jet ink can be adjusted by varying the ratio between the monomers and oligomers.

Any method of conventional radical polymerization, photo-curing system using photo acid or photo base generator, or photo induction alternating copolymerization may be employed. In general, radical polymerization and cationic polymerization are preferred, and photo induction alternating copolymerization needing no initiator may also be employed. Furthermore, a hybrid system of combinations of these systems is also effective.

Cationic polymerization is superior in effectiveness due to lack of inhibition of the polymerization by oxygen, however it is slow and expensive. If cationic polymerization is used, it is preferred to use an epoxy compound together with an oxetane compound to increase the rate of polymerization. Radical polymerization is the preferred polymerization process.

Any polymerizable compound commonly known in the art may be employed. Particularly preferred for use as a radiation-curable compound in the radiation-curable ink-jet black ink, according to the present invention, are monofunctional and/or polyfunctional acrylate monomers, oligomers or prepolymers, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, 2-acryloyloxyethylsuccinic acid, 2-acryloyxyethylphthalic acid, 2-acryloxyethyl-2-hydroxyethyl-phthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4butanediol diacrylate, 1,6hexanediol diacrylate, 1,9nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri(propylene glycol)triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, and caprolactam modified dipentaerythritol hexaacrylate, or an N-vinylamide such as, N-vinylcaprolactam or N-vinylformamide; or acrylamide or a substituted acrylamide, such as acryloylmorpholine.

Furthermore, methacrylates corresponding to the above-mentioned acrylates may be used with these acrylates. Of the methacrylates, methoxypolyethylene glycol methacrylate, methoxytriethylene glycol methacrylate, hydroxyethyl methacrylate, phenoxyethyl methacrylate, cyclohexyl methacrylate, tetraethylene glycol dimethacrylate, and polyethylene glycol dimethacrylate are preferred due to their relatively high sensitivity and higher adhesion to an ink-receiver surface.

Furthermore, the ink-jet inks may also contain polymerizable oligomers. Examples of these polymerizable oligomers include epoxy acrylates, aliphatic urethane acrylates, aromatic urethane acrylates, polyester acrylates, and straight-chained acrylic oligomers.

Photo-Initiators

A catalyst called a photo-initiator typically initiates the polymerization reaction. The photo-initiator requires less energy to activate than the monomers and oligomers to form the polymer.

The photo-initiator absorbs light and is responsible for the production of free radicals or cations. Free radicals or cations are high-energy species that induce polymerization of monomers, oligomers and polymers and with polyfunctional monomers and oligomers thereby also inducing cross-linking.

A preferred amount of initiator is 1-10 weight % of the total ink weight, and more preferably 1-6 weight % of the total ink weight.

Irradiation with actinic radiation may be realized in two steps by changing wavelength or intensity. In such cases it is preferred to use 2 types of initiator together.

Photo-initiators are necessary for free radical curing and may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl)butan-1-one, benzil dimethylketal, bis(2,6-dimethylbenzoyl)-2,4,4-trimethylpentylphosphine oxide, 2,4,6trimethylbenzoyldiphenylphosphine oxide, 2-methyl-1-[4-(methylthio)phenyl]-2-morpholinopropan-1-one, 2,2-dimethoxy-1,2-diphenylethan-1-one or 5,7-diiodo-3-butoxy-6-fluorone, diphenyliodonium fluoride and triphenylsulfonium hexafluophosphate.

Suitable photo-initiators for the ink-jet ink of the ink-jet printing system according to the present invention include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 4265 and Darocur™ ITX available from CIBA SPECIALTY CHEMICALS, Lucerin TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd. and isopropyl-thioxanthone.

Inhibitors

Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used. Of these, a phenol compound having a double bond in molecules derived from acrylic acid is particularly preferred due to its having a polymerization-restraining effect even when heated in a closed, oxygen-free environment. Suitable inhibitors are, for example, Sumilizer™ GA-80, Sumilizer™ GM and Sumilizer™ GS produced by Sumitomo Chemical Co., Ltd.

Since excessive addition of these polymerization inhibitors will lower the ink sensitivity to curing, it is preferred that the amount capable of preventing polymerization be determined prior to blending. The amount of a polymerization inhibitor is generally between 200 and 20,000 ppm of the total ink weight.

Suitable combinations of compounds which decrease oxygen polymerization inhibition with radical polymerization inhibitors are: 2-benzyl-2-dimethylamino-1-(4-morpholinophenyl)-butane-1 and 1-hydroxy-cyclohexyl-phenyl-ketone; 1-hydroxy-cyclohexyl-phenyl-ketone and benzophenone; 2-methyl-1[4-(methylthio)phenyl]-2-morpholinopropane-1-on or 2-methyl-1[4-(methylthio)phenyl]-2-morpholinopropane-1-on and diethyltuioxanthone or isopropylthioxanthone; and benzophenone and acrylate derivatives having a tertiary amino group, and addition of tertiary amines. An amine compound is commonly employed to decrease an oxygen polymerization inhibition or to increase sensitivity. However, when an amine compound is used in combination with a high acid value compound, the storage stability at high temperature tends to be decreased. Therefore, specifically, the use of an amine compound with a high acid value compound in ink-jet printing should be avoided.

Synergist additives may be used to improve the curing quality and to diminish the influence of the oxygen inhibition. Such additives include, but are not limited to ACTILANE™ 800 and ACTILANE™ 725 available from AKZO NOBEL, Ebecryl™ P115 and Ebecryl™ 350 available from UCB CHEMICALS and CD 1012, Craynor CN 386 (amine modified acrylate) and Craynor CN 501 (amine modified ethoxylated trimethylolpropane triacrylate) available from CRAY VALLEY.

The content of the synergist additive is in the range of 0 to 50 wt %, preferably in the range 5 to 35 wt % based on the total weight of the radiation-curable ink-jet black ink.

Resins

The radiation-curable ink-jet black ink according to the present invention may further contain a resin, also called a pigment stabilizer or dispersant, in order to obtain a stable dispersion of the pigment(s) in the ink-jet ink.

The pigments may be added to the radiation-curable ink-jet black ink according to the present invention as a dispersion comprising a dispersant.

Resins usable in this invention are not specifically restricted, but the following resins are preferred: petroleum type resins (e.g., styrene type, acryl type, polyester, polyurethane type, phenol type, butyral type, cellulose type, and rosin); and thermoplastic resins (e.g., vinyl chloride, vinylacetate type). Concrete examples of these resins include acrylate copolymers, styrene-acrylate copolymers, acetalized and incompletely saponified polyvinyl alcohol, and vinylacetate copolymers. Commercial resins are known under the tradenames Solsperse™ 32000 and Solsperse™ 39000 available from AVECIA, EFKA™ 4046 available from EFKA CHEMICALS BV, Disperbyk™ 168 available from BYK CHEMIE GMBH.

A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129. Suitable pigment stabilizers are also disclosed in U.S. Pat. No. 5,969,002 (BAYER), U.S. Pat. No. 5,720,802 (XEROX), U.S. Pat. No. 5,713,993 (DU PONT), PCT/GB95/02501, U.S. Pat. No. 5,085,689 (BASF) and. U.S. Pat. No. 2,303,376 (FUJITSU ISOTEC).

Typically resins are incorporated at 2.5% to 200%, more preferably at 50% to 150% by weight of the pigment.

Surfactants

The radiation-curable ink-jet black ink according to the present invention may contain at least one surfactant. The surfactant(s) can be anionic, cationic, non-ionic, or zwitterionic and are usually added in a total quantity below 20 wt % based on the total ink weight and particularly in a total below 10 wt % based on the total ink weight.

A fluorinated or silicone compound may be used as a surfactant, however, a potential drawback is bleed-out after image formation because the surfactant does not cross-link. It is therefore preferred to use a copolymerizable monomer having surface-active effects, for example, silicone-modified acrylates, silicone modified methacrylates, fluorinated acrylates, and fluorinated methacrylates. Specific examples are disclosed in U.S. Pat. No. 4,781,985 (JAMES RIVER GRAPHICS) and U.S. Pat. No. 5,084,340 (KODAK), herein incorporated by reference.

In a preferred embodiment of the radiation-curable inkjet ink set according to the present invention, at least one of the radiation-curable ink-jet inks contains a polyether modified poly-dimethyl-siloxane, with Byk™-333 available from BYK CHEMIE GMBH, being particularly preferred.

Solvents

The radiation-curable ink-jet black ink according to the present invention may contain as a solvent, water and/or organic solvents, such as alcohols, fluorinated solvents and dipolar aprotic solvents, the solvent preferably being present in a concentration between 10 and 80 wt %, particularly preferably between 20 and 50 wt %, each based on the total weight of the radiation-curable ink-jet black ink.

However, the radiation-curable ink-jet black ink according to the present invention preferably does not contain an evaporable component, but sometimes, it can be advantageous to incorporate an extremely small amount of an organic solvent in such inks to improve adhesion to the ink-receiver surface after UV curing. In this case, the added solvent can be any amount in the range which does not cause problems of solvent resistance and VOC, and preferably 0.1-5.0 wt %, and particularly preferably 0.1-3.0 wt %, each based on the total weight of the radiation-curable ink-jet black ink.

Suitable organic solvents include alcohol, aromatic hydrocarbons, ketones, esters, aliphatic hydrocarbons, higher fatty acids, carbitols, cellosolves, higher fatty acid esters. Suitable alcohols include, methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N,N-dimethylformamid may be used.

Humectants

When a solvent is used in the radiation-curable ink-jet black ink according to the present invention a humectant is usually added to prevent the clogging of the nozzle, due to its ability to slow down the evaporation rate of ink.

Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof, with a polyethylene glycol being particularly preferred. A humectant is preferably added to the ink-jet ink formulation in an amount of 0.1 to 20 wt % of the formulation, more preferably 0.1 to 10 wt % of the formulation, and most preferably approximately 4.0 to 6.0 wt %.

Biocides

Suitable biocides for the ink-jet ink of the present invention include sodium dehydroacetate, 2-phenoxyethanol, sodium benzoate, sodium pyridinethion-1-oxide, ethyl p-hydroxybenzoate and 1,2-benzisothiazolin-3-one and salts thereof. A preferred biocide for the ink-jet ink of the present invention is Proxel™ GXL available from ZENECA COLOURS.

A biocide is preferably added in an amount of 0.001 to 3 wt. %, more preferably 0.01 to 1.00 wt. %, each based on the ink-jet ink.

Preparation of an Ink-Jet Ink

A dispersion of colorant for use in an ink-jet ink of the radiation-curable ink-jet ink set according to the present invention may be prepared by mixing, milling and dispersion of colorant and resin. Mixing apparatuses may include a pressure kneader, an open kneader, a planetary mixer, a dissolver, and a Dalton Universal Mixer. Suitable milling and dispersion apparatuses are a colloid mill, a high-speed disperser, double rollers, a bead mill, a paint conditioner, and triple rollers.

In the process of mixing, milling and dispersion, each process is performed with cooling to prevent build up of heat, and as much as possible under light conditions in which UV-light has been substantially excluded.

The radiation-curable ink-jet black ink according to the present invention may be prepared using separate dispersions for each colorant, or alternatively several pigments may be mixed and co-milled in preparing the dispersion.

Ink-Receiver

The ink-receivers for use with a radiation-curable black ink-jet ink according to the present invention are preferably substantially non-absorbing. Suitable examples are a resin-coated paper, e.g. polyethylene-coated paper and polypropylene-coated paper. The ink-receiver can be transparent, translucent or opaque.

Suitable ink-receivers for use with a radiation-curable black ink-jet ink according to the present invention are polymeric substrates, for example, cellulose acetate propionate, cellulose acetate butyrate, polyesters such as polyethylene terephthalate (PET) and polyethylene naphthalate (PEN); oriented polystyrene (OPS); oriented nylon (ONy); polypropylene (PP), oriented polypropylene (OPP); polyvinyl chloride (PVC); and various polyamides, polycarbonates, polyimides, polyolefins, poly(vinylacetals), polyethers and polysulfonamides, opaque white polyesters and extrusion blends of polyethylene terephthalate and polypropylene. Acrylic resins, phenol resins, glass and metals may also be used as an ink-receiver. Other suitable ink-receiver materials can be found in Modern Approaches to Wettability: Theory and Applications. Edited by SCHRADER, Malcolm E., et al. New York: Plenum Press, 1992. ISBN 0306439859.

The ink-receiver may also incorporate mineral particles as fillers, such as e.g. PET containing $CaCO_3$, PET containing $TiO_2$, a-PET and PET-g.

The ink-receiver before printing may be coloured, e.g. a transparent PET containing a blue dye suitable for medical imaging may be used as an ink-receiver.

Polyester film substrates and especially polyethylene terephthalate are preferred for certain applications particularly types with excellent dimensional stability. When such a polyester is used as the ink-receiver, a subbing layer may be employed to improve the bonding of the jetted ink layer to the substrate, if it constitutes together with the unsubbed substrate a substantially non-absorbing ink-receiver. Useful subbing layers for this purpose are well known in the photographic art and include, for example, polymers of vinylidene chloride such as vinylidene chloride/acrylonitrile/acrylic acid terpolymers or vinylidene chloride/methyl acrylate/itaconic acid terpolymers.

Stabilizers, leveling additives, matting agents, adjusting agents for physical film properties such as waxes, may also be added to the subbing layer as required.

Means for Jetting

For the radiation-curable black ink-jet ink according to the present invention, the means for jetting is a printing head ejecting small droplets of ink in a controlled manner through nozzles onto an ink-receiver surface, which is moving relative to the printing head(s). The ejected or jetted ink forms an image on the ink-receiver surface. At high printing speeds, the inks must be ejected readily from the printing heads, which puts a number of constraints on the physical properties of the ink, e.g. a low viscosity at the jetting temperature, which may vary from 25 to 110° C., a surface energy such that the printing head nozzle can form the necessary small droplets and a homogenous liquid capable of rapid conversion to a dry printed area.

A preferred printing head for jetting the radiation-curable black ink-jet ink according to the present invention is a piezoelectric head. Piezoelectric ink-jet printing is based on the movement of a piezoelectric ceramic transducer when a voltage is applied thereto. Application of a voltage changes the shape of the piezoelectric ceramic transducer in the printing head creating a void, which is then filled with ink. When the voltage is removed, the ceramic expands to its original shape, ejecting a droplet of ink from the print head.

The means for jetting the radiation-curable black ink-jet ink according to the present invention is however not restricted to a piezoelectric ink-jet printing head. Other ink-jet printing heads for ink ejection can be used and include various types, such as a continuous types and thermal, electrostatic and acoustic drop on demand types.

A preferred embodiment of a printing mode with a radiation-curable black ink-jet ink according to the present invention, is bi-directional printing, wherein an ink-jet printing head scans back and forth in a transversal direction across the moving ink-receiver surface. Bi-directional printing results in a high areal throughput.

The radiation-curable black ink-jet ink according to the present invention can also be advantageously used in a "single pass printing process". This is a novel printing mode, which can be performed by using page wide ink-jet printing heads (e.g. a page wide printing head available from XAAR) or multiple staggered ink-jet printing heads which cover the entire width of the ink-receiver surface. In a single pass printing process the ink-jet printing heads usually remain stationary and the ink-receiver surface is transported under the ink-jet printing heads. An example of such a single pass ink-jet printer is "The Dot Factory" manufactured by DOTRIX.

High areal throughput ink-jet printing means that images should be printed at more than 50 $m^2$/hour, preferably at more than 100 $m^2$/hour, even more preferably at more than 200 $m^2$/hour and most preferably at more than 300 $m^2$/hour. The resolution should at least be 180 dpi, preferably at least 300 dpi. The ink-receiver used in the high areal throughput ink-jet printing system according to this invention has preferably a width of at least 240 mm, then requiring a printing speed of at least 35 m/min. More preferably the width of the ink-receiver is at least 300 mm, and particularly preferably the width of the ink-receiver is at least 500 mm.

Curing Means

The radiation-curable black ink-jet ink according to the present invention is jetted upon an ink-receiver surface, creating an uncured printed image. Subsequently, this printed image is cured by radiation or electron beam exposure. A preferred means of radiation curing is ultraviolet light.

The curing means may be arranged in combination with the print head of the ink-jet printer, travelling therewith so that images printed upon the surface of the ink-receiver are exposed to curing radiation very shortly after having been printed on the ink-receiver. In such an arrangement it can be difficult to provide a small enough radiation source connected to and travelling with, the print head. Therefore, a static fixed radiation source may be employed, e.g. a source of curing UV radiation, connected to the radiation source by means of flexible radiation conductive means such as a fibre optic bundle or an internally reflective flexible tube.

Alternatively, the curing radiation may be supplied from a fixed source to the radiation head by an arrangement of mirrors including a mirror on the radiation head.

A source of radiation arranged not to move with the print head, may also be an elongate radiation source extending transversely across the ink-receiver surface to be cured and adjacent to the transverse path of the print head so that the subsequent rows of images formed by the print head are passed, stepwise or continually, beneath the radiation source.

In practice, it may be desirable to provide a plurality of print heads in relative close proximity in a printing station, for printing with different coloured inks to produce a multi-coloured image. In that case, each has its own dedicated radiation source.

Any ultraviolet light source may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:
UV-A: 400 nm to 320 nm
UV-B: 320 nm to 290 nm
UV-C: 290 nm to 100 nm.

Furthermore, it is possible to cure the printed image using two light sources of differing wavelength or illuminance. For example, the first UV source can be selected to be rich in UV-C, in particular in the range of 240 nm-200 nm. The second UV source can then be rich in UV-A, e.g. a gallium-doped lamp, or a different lamp high in both UV-A and UV-B. The use of two UV sources has been found to have advantages e.g. a faster curing speed.

It is known that differently coloured inks absorb UV radiation differently, i.e. they each absorb differently in each of the UV-A, UV-B and UV-C range. Having two curing lamps ensures complete curing of all the colours in a single pass. For example, some ink-jet inks absorb UV-C, so that deep parts of the ink layers may not be cured with the first UV source. The first UV-C-rich source completes the curing of the parts of the ink layers close to the surface. The second UV source in such a case cures the deeper parts of the ink layers. Thus all inks, even "difficult" colours such as black and thick inks, may be cured in a single pass.

For facilitating curing, the ink-jet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

INDUSTRIAL APPLICATION

The radiation-curable black ink-jet ink according to the present invention can, for example, be used in more traditional ink-jet printing applications on flat surfaces such as polymeric supports for poster printing, but also in new emerging applications such as decorative printing (e.g. wallpaper, curtains and floorcovering), printing on unusual objects (e.g. ski's and mobile phone covers) and security printing applications (e.g. passports and identity cards).

EXAMPLES

The present invention will now be described in detail by way of Examples hereinafter.
Measurement Methods
1. Chroma Printed samples were measured with a spectrophotometer (GRETAG SPM, manufactured by GRETAG INC.) to determine the coordinates of the CieL*a*b* colour system of the colour difference indication method specified in CIE (Commission International de l'Eclairage). In this case, the measurement was carried out under conditions of light source D50, provision of no light source filter, absolute white as reference white, and angle of visibility 2°. In case of prints on an opaque ink receiver (e.g. PE-paper) the measurement is performed with the opaque receiver lying on a white background. In case of a transparent ink receiver (e.g. PET film), the receiver is placed on top of the same unprinted PE-paper, and then on a white background. The chroma C* is defined as:

$$C^* = \sqrt{(a^*)^2 + (b^*)^2}$$

where a* and b* are the hue values in the CieL*a*b* colour system.

The a* value is a measure of the colour along the green/red axis, with a negative value being greener, and the b* value is a measure of the colour along the blue/yellow axis, with a negative value being more blue. A black print exhibits a neutral tone for very small values of a* and b*. The chroma C*-value is preferably not larger than 4.0, and most preferably smaller than 1.5. For C* smaller than 1.5, the tone of a printed black is seen as a perfectly neutral black. The visual tone is almost observed as neutral with a chroma C* smaller than 4.0.
2. Visual Tone A visual evaluation of the black tone was performed in accordance with the following criterion:
1=neutral black
2=light brownish black
3=brownish black
4=brown black
3. Colour Hue Change ΔE The difference in colour value in the CieL*a*b* colour-space between two print patches of the same colour is typically described by the colour hue change ΔE. The coordinates L*, a* and b* of printed samples were measured with a spectrophotometer (GRETAG SPM, manufactured by GRETAG INC.) in the same manner as for determining the Chroma.

The colour hue change ΔE was determined by substituting the lightness values $L_1^*$ and the hue values $a_1^*$ and $b_1^*$ obtained for an ink order when printing from left-to-right for $L_1^*$, $a_1^*$ and $b_1^*$ and by substituting the lightness values $L_2^*$ and the hue values $a_2^*$ and $b_2^*$ obtained for an ink order when printing from right-to-left for $L_2^*$, $a_2^*$ and $b_2^*$ in the following equation:

$$\Delta E = \sqrt{(L_1^* - L_2^*)^2 + (a_1^* - a_2^*)^2 + (b_1^* - b_2^*)^2}$$

Colour hue change ΔE-value of 1.0 or above are perceived by the naked eye.

4. Viscosity

The viscosity of the ink-jet inks was measured with a Brookfield DV-II+ viscometer at 25° C. and shear rate 3 RPM.

5. Surface Tension

The surface tension of an ink-jet ink was measured with a Krüss tensiometer K9 (Wilhelmy plate principle).

Materials

All materials used in the following examples were readily available from Aldrich Chemical Co. (Belgium) unless otherwise specified. The "water" used in the examples was demineralized water.

The following materials were used:
Pigments
Carbon Black MA8™ is a carbon black available from MITSUBISHI CHEMICAL.
Special Black™ 550 is a carbon black available from DEGUSSA.
Printex™ 90 is a carbon black available from DEGUSSA.
Hostaper™ Red E5B02 is a magenta pigment (Pigment Violet 19) available from CLARIANT
Sunfast™ Blue 249-1284 is a cyan pigment (Pigment Blue 15:3) available from SUN CHEMICAL
Radiation Sensitive Compounds
DPGDA™ is a difunctional acrylate monomer available from UCB.
Craynor™ CN 501 is a monomer available from CRAY VALLEY.
Sartomer™ SR9003 is a difunctional acrylate monomer available from SARTOMER
Craynor™ CN 386 is an amine modified acrylate synergist available from CRAY VALLEY.
Irgacure™ 500 is a photo-initiator available from CIBA SPECIALTY CHEMICALS.
Irgacure™ 1870 is a photo-initiator available from CIBA SPECIALTY CHEMICALS.
Darocur™ ITX is a photo-initiator available from CIBA SPECIALTY CHEMICALS.
Surfactants & Dispersants
Solsperse™ 32000 is a resin available from AVECIA.
Solsperse™ 5000 is a resin available from AVECIA.
Byk™-333 is a surfactant available from BYK CHEMIE GMBH.
Ink-Receivers
PE-paper is a poly(ethylene) coated unsubbed RC-paper available from FRANTSCHACH BELCOAT (Belgium).
PET is an unsubbed 175 μm thick polyethylene terephthalate clearbase film available from AGFA.

Example 1

In this example the image tone of a radiation-curable ink-jet black ink according to the present invention is compared with different radiation-curable ink-jet black inks employing typical carbon black pigments.

Preparation of Radiation-Curable Ink-Jet Black Inks

The ink-jet inks in this example consist of 100% solids, no solvents or water are used during the preparation of the ink composition. The ink compositions Ink-1 to Ink-8 were prepared according to Table 1. The weight % (wt %) was based on the total ink weight.

TABLE 1

| wt % of: | Ink-1 | Ink-2 | Ink-3 | Ink-4 | Ink-5 | Ink-6 | Ink-7 | Ink-8 |
|---|---|---|---|---|---|---|---|---|
| Special Black TM 550 | 4.00 | — | — | — | — | — | — | — |
| Printex™ 90 | — | 4.00 | — | — | — | — | — | — |
| Carbon Black MA8™ | — | — | 4.00 | 3.00 | 2.25 | 2.25 | 2.25 | 2.25 |
| Hostaperm™ Red E5B02 | — | — | — | — | 0.60 | 0.60 | 0.90 | 0.90 |
| Sunfast™ Blue 249-1284 | — | — | — | — | 0.60 | 0.90 | 0.60 | 0.90 |
| DPGDA™ | 42.00 | 42.00 | 42.00 | 37.97 | 39.77 | 39.47 | 39.47 | 39.17 |
| Craynor™ CN 501 | 38.97 | 38.97 | 38.97 | — | — | — | — | — |
| Sartomer™ SR9003 | — | — | — | 40.00 | 40.00 | 40.00 | 40.00 | 40.00 |
| Irgacure™ | 5.00 | 5.00 | 5.00 | — | — | — | — | — |
| Irgacure™ 1870 | 2.00 | 2.00 | 2.00 | — | — | — | — | — |
| Darocur™ ITX | — | — | — | 5.00 | 5.00 | 5.00 | 5.00 | 5.00 |
| Craynor™ CN 386 | 5.00 | 5.00 | 5.00 | 10.00 | 10.00 | 10.00 | 10.00 | 10.00 |
| Byk™-333 | 0.03 | 0.03 | 0.03 | 0.03 | 0.03 | 0.03 | 0.03 | 0.03 |
| Solsperse™ 32000 | 4.00 | 4.00 | 4.00 | 4.00 | 4.00 | 4.00 | 4.00 | 4.00 |
| Viscosity (mPa·s) | 54.7 | 59.9 | 52.2 | 20.3 | 19.4 | 23.0 | 23.3 | 23.5 |
| Surface tension (mN/m) | | | | 27.4 | 29.1 | 29.5 | 28.6 | 28.5 |

First a concentrated dispersion was prepared of the pigments by mixing the pigment, the polymeric dispersant Solsperse™ 32000 and the monomer DPGDA™ with a dissolver and treating this mixture with an Eiger bead mill. The second monomer, the synergist Craynor™ CN 386, the surfactant Byk™-333 and the photo-initiator(s) were added in this order under stirring to the concentrated pigment dispersion. Stirring was continued for one hour to ensure that all components were well distributed. A homogeneous ink composition was obtained.

For the invention ink-jet inks Ink-5 to Ink-8, three separate pigment dispersions (one for each pigment) were prepared according to the method described above for preparing a concentrated dispersion and then mixed together in the amounts according to Table 1.

Evaluation of the Properties

The ink compositions Ink-1 to Ink-3 were coated on PET and the ink compositions Ink-4 to Ink-8 were coated on PE-paper using a bar coater and a 10 μm wired bar. The coated ink layers were cured using a Fusion DRSE-120 conveyer, equipped with a Fusion VPS/1600 lamp (Dbulb), which transported the samples under the UV lamp on a conveyer belt at a speed of 20 m/min.

TABLE 2

| Sample | Substrate | Ink | L* | a* | b* | C* | Visual tone |
|---|---|---|---|---|---|---|---|
| COMP-1 | PET | Ink-1 | 7.1 | 3.77 | 4.56 | 5.9 | 3 to 4 |
| COMP-2 | PET | Ink-2 | 6.0 | 3.50 | 4.46 | 5.4 | 3 to 4 |
| COMP-3 | PET | Ink-3 | 7.0 | 4.85 | 5.58 | 7.4 | 4 |
| COMP-4 | PE-paper | Ink-4 | 14.9 | 4.81 | 11.07 | 12.1 | 4 |
| INV-1 | PE-paper | Ink-5 | 12.3 | 0.44 | 3.05 | 3.1 | 2 |
| INV-2 | PE-paper | Ink-6 | 11.9 | −3.12 | 1.05 | 3.3 | 2 |

TABLE 2-continued

| Sample | Substrate | Ink | L* | a* | b* | C* | Visual tone |
|---|---|---|---|---|---|---|---|
| INV-3 | PE-paper | Ink-7 | 11.8 | 2.56 | 3.04 | 4.0 | 2 |
| INV-4 | PE-paper | Ink-8 | 12.1 | −0.90 | 0.78 | 1.2 | 1 |

From Table 2 it is clear that the comparative samples COMP-1 to COMP-4 using different types of black pigments or ink compositions exhibited a strong and unpleasant brown tone. The inventive samples INV-1 to INV-3 all displayed an almost neutral black tone, while inventive sample INV-4 displayed a perfectly neutral black tone. The chroma C*-value of all inventive samples was not larger than 4.0.

Example 2

In this example the bi-directional hue shift is illustrated by changing the order of the radiation-curable black and colour ink-jet inks on PE-paper.

Preparation of Radiation-Curable Ink-Jet Black Inks

The ink-jet inks in this example consist of 100% solids, no solvents or water are used during the preparation of the ink composition. The ink compositions Ink-K (Carbon black ink), Ink-M (Magenta ink), Ink-C (Cyan ink) and Ink-B (Black ink according to the invention) were prepared according to Table 3. The weight % (wt %) was based on the total ink weight.

TABLE 3

| wt% of: | Ink-K | Ink-M | Ink-C | Ink-B |
|---|---|---|---|---|
| Carbon Black MA8 ™ | 3.00 | — | — | 2.25 |
| Hostaperm ™ Red E5B02 | — | 5.00 | — | 0.90 |
| Sunfast ™ Blue 249–1284 | — | — | 2.00 | 0.90 |
| DPGDA ™ | 37.97 | 34.97 | 40.47 | 36.87 |
| Sartomer ™ SR9003 | 40.00 | 40.00 | 40.00 | 40.00 |
| Darocur ™ ITX | 5.00 | 5.00 | 5.00 | 5.00 |
| Craynor ™ CN 386 | 10.00 | 10.00 | 10.00 | 10.00 |
| Byk ™- 333 | 0.03 | 0.03 | 0.03 | 0.03 |
| Solsperse ™ 32000 | 3.00 | 5.00 | 2.00 | 4.05 |
| Solsperse ™ 5000 | — | — | 0.50 | — |

First a concentrated dispersion was prepared of the pigments by mixing the pigment, the polymeric dispersant Solsperse™ 32000 and the monomer DPGDA™ with a dissolver and treating this mixture with an Eiger bead mill. For preparing Ink-C, a second polymeric dispersant Solsperse™ 5000 was used in combination with Solsperse™ 32000. The second monomer Sartomer™ SR9003, the synergist Craynor™ CN 386, the surfactant Byk™-333 and the photo-initiator Darocur™ ITX were added in this order under stirring to the concentrated pigment dispersion. Stirring was continued for one hour to ensure that all components were well distributed. A homogeneous ink composition was obtained.

For the invention ink-jet ink Ink-B, three separate pigment dispersions (one for each pigment) were prepared according to the method described above for preparing a concentrated dispersion and then mixed together in the amounts according to Table 3.

Evaluation of the Properties

The ink compositions were coated according to Table 4 on PE-paper using a bar coater and a 10 μm wired bar. Each coated ink layer was cured using a Fusion DRSE-120 conveyer, equipped with a Fusion VPS/1600 lamp (Dbulb), which transported the samples under the UV lamp on a conveyer belt at a speed of 20 m/min.

TABLE 4

| Sample | First Ink | Second Ink | Third Ink |
|---|---|---|---|
| COMP-5 | Ink-K | — | — |
| COMP-6 | Ink-K | Ink-M | Ink-C |
| COMP-7 | Ink-K | Ink-C | Ink-M |
| COMP-8 | Ink-M | Ink-C | Ink-K |
| COMP-9 | Ink-C | Ink-M | Ink-K |
| INV-5 | Ink-B | — | — |

The coating of each ink was followed by a curing step. For example, sample COMP-7 of Table 4 was prepared by coating the Ink-K as the first ink layer on the PE-paper, curing this coated layer, then applying the Ink-M as the second ink layer on top of the cured first ink layer, followed again by curing and finally coating the Ink-C as the third ink layer on the cured second ink layer and curing this third ink layer.

The comparative sample set COMP-7 and COMP-10 and comparative sample set COMP-8 and COMP-9 both are illustrations of the bi-directional printing process.

TABLE 5

| Sample | L* | a* | b* | C* | Visual Tone |
|---|---|---|---|---|---|
| COMP-6 | 11.5 | 4.68 | 9.25 | 10.37 | 4 |
| COMP-7 | 7.0 | 1.40 | 1.27 | 1.89 | 2 |
| COMP-8 | 7.8 | 2.29 | 2.22 | 3.19 | 3 |
| COMP-9 | 10.2 | −0.08 | 2.71 | 2.71 | 2 |
| COMP-10 | 9.8 | 1.48 | 3.27 | 3.59 | 3 |
| INV-2 | 12.4 | −0.88 | 0.90 | 1.26 | 1 |

Table 5 shows that the chroma C* values of comparative samples COMP-7 to COMP-10 are clearly better than the chroma C* value of comparative sample COMP-6, wherein only a carbon black ink used. However, chromatic variations are observed for the comparative sample set COMP-7 and COMP-10 and the comparative sample set COMP-8 and COMP-9. In both cases, a colour hue change ΔE of 3.4 was calculated, which is clearly visible by the naked eye. The invention sample INV-2 displayed a nearly neutral tone and no chromatic variations would be observed when ink-jet printing this ink-B in bi-directional mode.

Having described in detail preferred embodiments of the current invention, it will now be apparent to those skilled in the art that numerous modifications can be made therein without departing from the scope of the invention as defined in the following claims.

The invention claimed is:

1. A radiation-curable ink-jet ink set comprising only one radiation-curable ink-jet black ink and at least three radiation-curable ink-jet color inks wherein the radiation-curable ink-jet black ink includes at least one black pigment, at least one color pigment, at least one surfactant, at least one photoinitiator and at least one radiation-curable compound,
   wherein the wavelength of the absorption maximum of the color pigment is located between 500 and 700 nm;
   wherein the at least one radiation-curable compound is a monofunctional or polyfunctional acrylate monomer;
   wherein the photoinitiator is present in an amount of 1-6 weight % of the total ink weight;
   wherein the ink-jet black ink is free of a fluorinated surfactant;
   wherein the ink-jet ink has a viscosity of less than 30 mPa·s at a shear rate of 100 s$^{-1}$ and at 25° C.; and
   wherein the radiation-curable ink-jet black ink has a chroma C* of less than 1.5.

2. The radiation-curable ink jet ink set according to claim 1, wherein at least one of said radiation-curable ink jet inks comprises a polyether modified poly-dimethyl-siloxane.

3. The radiation-curable ink-jet ink set according to claim 1, wherein the at least one color pigment is C.I. Pigment Blue 15:3.

4. The radiation-curable ink-jet ink set according to claim 1, wherein the radiation-curable ink jet black ink further comprises a copolymerizable monomer having surface-active effects.

5. The radiation-curable ink-jet ink set according to claim 4, wherein the copolymerizable monomer having surface-active effects is a silicone-modified acrylate or a silicone-modified methacrylate.

6. The radiation-curable ink jet ink set according to claim 1, the ink set further comprising a light magenta ink and a light cyan ink.

7. The radiation-curable ink-jet ink set according to claim 1, the ink set further comprising a white ink.

8. The radiation-curable ink-jet ink set according to claim 1, the ink set further comprising an ink for a spot color.

9. The radiation-curable ink jet ink set according to claim 8, wherein the spot color is orange, green, red or blue.

10. The radiation-curable ink jet ink set according to claim 1, wherein said at least one pigment comprises a cyan pigment and a magenta pigment.

11. The radiation-curable ink jet ink set according to claim 1, wherein said at least one radiation-curable compound is a difunctional monomer.

12. The radiation-curable ink jet ink set according to claim 1, wherein the radiation-curable ink-jet black ink comprises a second difunctional monomer.

13. The radiation-curable ink jet ink set according to claim 1, wherein the radiation-curable ink-jet black ink has a solvent content of less than 5 wt % based on the total weight of the radiation-curable ink-jet black ink.

14. The radiation-curable ink-jet ink set according to claim 1, wherein the at least one photoinitiator consists of one or more photoinitiators that initiate free radical curing.

15. A process for ink-jet printing comprising the steps of:
    a) providing a radiation-curable ink jet ink set comprising only one radiation-curable ink-jet black ink and at least three radiation-curable ink-jet color inks wherein the radiation-curable ink-jet black ink comprises at least one black pigment, at least one surfactant, at least one color pigment, at least one photoinitiator, and at least one radiation-curable compound,
    wherein the wavelength of the absorption maximum of the color pigment is located between 500 and 700 nm,
    wherein the at least one radiation-curable compound is a monofunctional or polyfunctional acrylate monomer,
    wherein the ink-jet black ink is free of a fluorinated surfactant,
    wherein the radiation-curable ink has a viscosity of less than 30 mPa·s at a shear rate of 100 s$^{-1}$ at 25° C., and
    wherein the radiation-curable ink-jet black ink has a chroma C* of less than 1.5; and
    b) jetting said radiation-curable ink-jet black ink on a substantially non-absorbing ink-jet ink receiver.

16. The process for ink-jet printing according to claim 15, further comprising the step of:
    c) curing said jetted radiation-curable ink-jet black ink on said substantially non-absorbing ink-jet ink receiver with UV radiation or electron beam exposure.

17. The process for ink-jet printing according to claim 15, wherein the areal throughput printing speed is at least 50 m$^2$/hour at a resolution of at least 180 dpi.

18. The process for ink-jet printing according to claim 15, wherein the at least one photoinitiator consists of one or more photoinitiators that initiate free radical curing.

19. A process of forming an imaged article having neutral black tone comprising the steps of:
    a) providing a radiation-curable ink-jet ink set comprising only one radiation-curable ink-jet black ink and at least three radiation-curable ink-jet color inks wherein the radiation-curable ink-jet black ink comprises at least one black pigment, at least one surfactant, at least one color pigment, at least one photoinitiator, and at least one radiation-curable compound,
    wherein the wavelength of the absorption maximum of the color pigment is located between 500 and 700 nm,
    wherein the at least one radiation-curable compound is a monofunctional or polyfunctional acrylate monomer,
    wherein the ink-jet black ink is free of a fluorinated surfactant,
    wherein the radiation-curable ink has a viscosity of less than 30 mPa·s at a shear rate of 100 s$^{-1}$ at 25° C.; and
    wherein the radiation-curable ink-jet black ink has a chroma C* of less than 1.5;
    b) jetting said radiation-curable ink jet black ink on a substantially non-absorbing ink-jet ink receiver, and
    c) curing said jetted radiation-curable ink-jet black ink on said substantially non-absorbing ink-jet ink receiver with UV radiation or electron beam exposure.

20. The process of forming an imaged article having neutral black tone according to claim 19, wherein the at least one photoinitiator consists of one or more photoinitiators that initiate free radical curing.

* * * * *